April 15, 1969
G. J. HANNES
3,438,401
SILICEOUS FIBER AIR DUCT
Filed Dec. 27, 1966
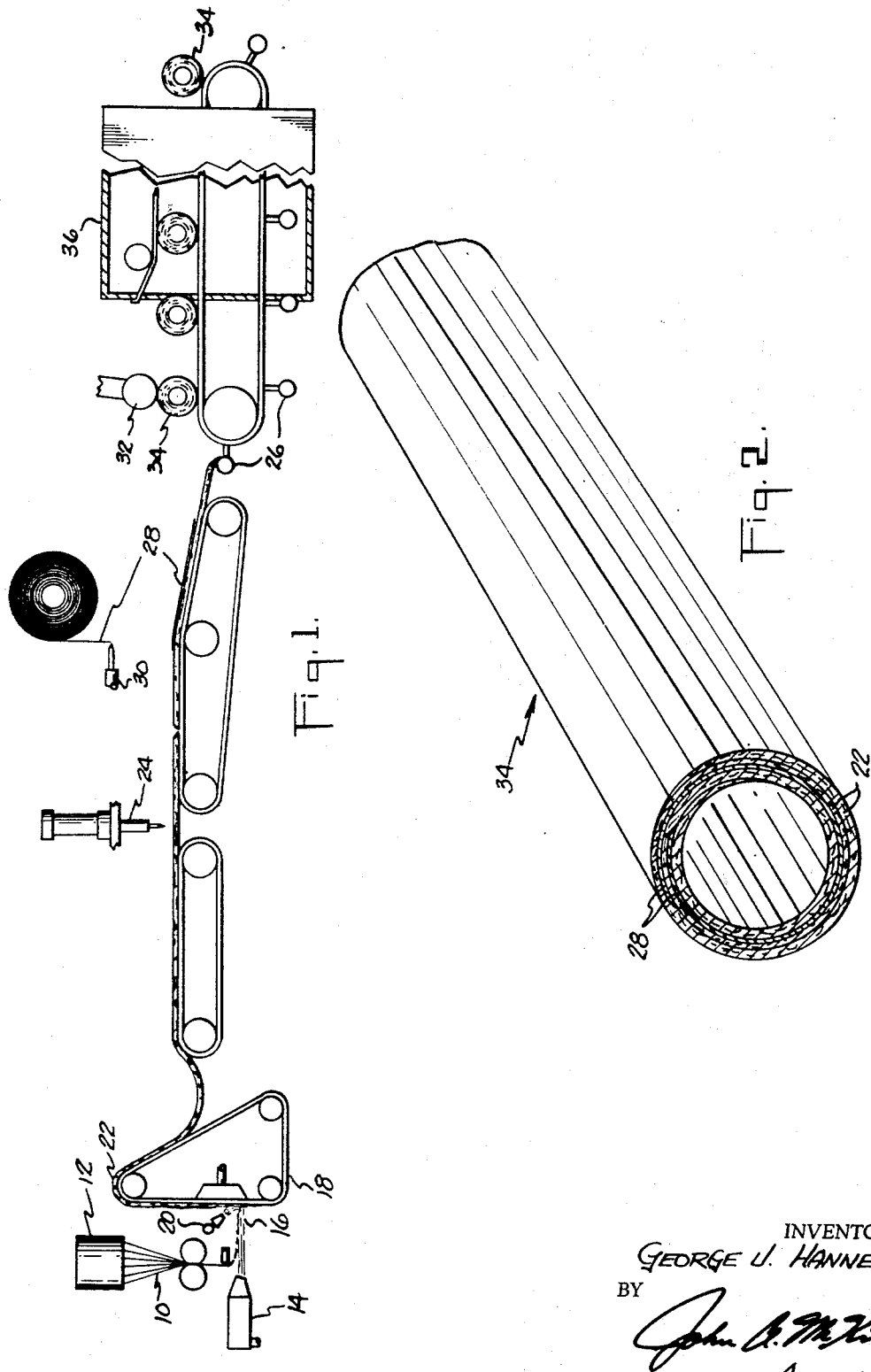
INVENTOR.
GEORGE J. HANNES
BY
John B. McKinney
ATTORNEY 3,438,401
SILICEOUS FIBER AIR DUCT
George J. Hannes, Maumee, Ohio, assignor to Johns-Manville Corporation, New York, N.Y., a corporation of New York
Continuation-in-part of application Ser. No. 330,237, Dec. 13, 1963. This application Dec. 27, 1966, Ser. No. 617,737
Int. Cl. F16l 9/14
U.S. Cl. 138—141                                    11 Claims This application comprises a continuation-in-part application of applicant's copending application Ser. No. 330,237, filed Dec. 13, 1963 and now abandoned.

This invention relates to fiber ducts and particularly to economical and efficient ducts having an integral gas seal. More specifically, this invention relates to glass fiber air ducts having an internally positioned air seal, which ducts are adapted for air conveying systems.

Conventional air conveyance systems, whether for heated air or cooled air, have for many years been formed from sheet metal. It has been recognized that the thermal resistivity of such conveying systems has been comparatively low. For example, ducts used in perimeter heating are frequently disposed in open areas such as attics and basements and serve to conduct hot air from a central source to the wall outlets resulting in considerable heat loss through the sheet metal.

The industry has continually investigated means to overcome this problem and has employed many insulating materials, one of the most widely used being fine fibers of common glass. These fibers, made by the conventional gas attenuating processes, are generally combined in mat form with a resinous or other adhesive bonding agent, such as a thermosetting resin, which is cured to bond the fibers into a durable, resilient, self-retaining mat product. These fibrous products are used to insulate the metal ducts both internally and externally. The end result, however, has had the disadvantage of additional cost, not only for the insulation per se but also with regard to the installation of the mats.

It has been also devised that the duct may be formed solely of glass fibers and used alone in the air conveying system. The process generally involves wrapping the resin-impregnated mat upon a mandrel and subjecting it to the proper heat and pressure conditions to set the resin and to impart the final duct shape to the fibrous mass. U.S. Letters Patent Nos. 2,331,146; 2,428,613; and 2,790,464 are representative of such techniques. These products have been commercially successful, but, because of the quantity of fiber necessary to produce sufficient impermeability, insulation and other physical properties, have not economically competed for low cost heating anr cooling systems.

Recently, synthetic resin film jackets have been provided for the glass fiber ducts to function as an air seal and to improve the appearance. The plastic jacketed fiber duct has overcome some of the earlier problems, but, because of the physical properties and manufacturing techniques, has proven to be a premium article which has not received extensive use and has not been economically competitive with sheet metal ducts. Consequently, the art has been left with a need for an inexpensive, insulated, air-sealed glass fiber air duct which will satisfy various commercial, industrial, and residential applications as a functional quality product.

It is therefore a principal object of this invention to provide an interfelted siliceous fiber duct having mass integrity, good heat resistance and good heat insulating capacity.

A further object of this invention is to provide fiber ducts using a minimum amount of materials, and to eliminate the need for an exterior jacket and its application costs, while providing a functional quality duct product with good air seal properties.

A further object of this invention is to provide an economical method of producing the article described in the foregoing objects.

Another object of this invention is to reduce the amount of fiber necessary to produce fiber ducts and to eliminate the exterior jacket and its application costs, while still providing a functional quality duct product with good air seal properties.

A still further object of this invention is to provide a fiber duct construction and product of improved durability and resistance to puncture tear or other rupture of the gas seal or its separation, and the resutling air leaks.

Other objects and further scope of applicability of the present invention will become apparent from the detailed description given hereinafter.

It has been discovered that the foregoing objects may be satisfied, and the above-discussed disadvantages overcome, by new fiber duct construction and new method of duct formation involving controlled insertion of a gas seal impervious sheet within the duct wall.

Glass fibers, which currently comprise the most common fibrous material for insulations and related products, are made according to the conventional procedures by drawing continuous glass filaments through small orifices in pots containing molten glass. The filaments are subjected to hot gaseous blasts which soften and attenuate the filaments into small lengths of individual fine fibers. It is understood that the method and apparatus for producing glass fibers is disclosed in U.S. Letters Patent Nos. 2,663,906 and 2,814,657 to Labino. The fibers are collected on a moving formation conveyor and a binder, typically a thermosetting resin, is introduced into the mat. In the manufacture of conventional ducts, the mat is cut into predetermined lengths corresponding to the length of the total number of convolutions of mat to be employed subsequently in the duct. The length of the mat is wrapped around a mandrel to form a cylindrical uncured duct. The mandrel has an outer diameter corresponding to the inner diameter of the duct. Sufficient layers of mat are wrapped to permit a 2 to 10 pound density duct after curing.

Although glass fibers are preferred due to their ease of formation and thus availability in fine diameters and apt lengths, and at costs, other common materials which can be fiberlized as by usual means of spinning, drawing, attenuating, blowing, etc. into fine diameter fiber can be employed exclusively or in part in the formation of the mat. These may include known products manufactured from various source materials of silicates of metal oxides, such as rock wools from argillaceous matter or shale, slag wool from metallurgical slags, each commonly referred to as "mineral wools," aluminum silicate fibers, and any fibers of the so-called glasses.

The air seal is inserted during the wrap up by first completing at least one full wrap of the fiber mat around the mandrel and then interleaving a thin foil approximately 0.00025–0.002 inch thin for between 1 up to approximately 5 convolutions of the mat. This is accomplished by laying the foil in cut sheet form on top of the fiber mat and winding it into the section.

The setting of the binder and fixing of the duct shape and dimension may be effected by incrementally activating the binder. That is, the binder in the peripheral surface area of the duct is activated to form an outer shell about the duct and subsequently the remaining binder in the duct is cured to a final stage. This technique permits accurate control of the duct dimension by immediately fixing the outer diameter and insuring all the dimensions will be symmetrically formed about the center axis during the subsequent final curing to provide uniform thickness and density throughout the duct. This technique is more finally explained in U.S. Letters Patent No. 3,063,887 to Labino.

Typical fibrous materials of glass for effective thermal insulation comprise those sized between 0.00006 and 0.00030 inch in diameter, with those between 0.00014 and 0.00018 inch being preferred for optimum insulating properties. The fibers are combined in very low density mat form to provide ultimately ducts with densities ranging between about 2 and about 10 pounds per cu. ft. with about 3–6 pounds per cu. ft. being preferred. The preferred density may vary from 3.5 pounds per cu. ft. for 4–6 inches diameter duct to 4.5 pounds per cu. ft. for large diameter units, e.g., 16-inch diameter duct. As such, effective strength and insulating characteristics, together with the air seal, are provided with relatively thin walls of less than about 1.5 inches and normally of only a fraction of an inch, e.g. 0.5 or 0.75 inch.

During the mat formation the binder is used in amounts varying between 5 and 30% by weight of the mat. With most binders, if the amount is decreased below 5%, the product normally will not exhibit good strength properties; above 30% typical binders provide no additional benefits and costs and increased thermal conductivity becomes a consideration. It has been found that between 10 and 15% of common binders, such as thermosetting resins, is preferred. Any available binder such as the thermosetting resin binders may be used, with phenol formaldehyde preferred. Included in the group of suitable thermosetting resins are reaction products of the phenols, cresols, resorcinols, and their derivatives, and the like, with an aldehyde; nitrogenous resin forming compounds, such as urea and melamine, with an aldehyde, such as formaldehyde, and other condensation reaction products of furfuryl alcohol, furfural, aniline, and the like. The binder component, however, may comprise non-resinous materials which are moisture resistant and will endure the temperature conditions encountered, for exemple phosphate adhesives, colloidal silica such as Du Pont's Ludox or colloidal alumina such as Du Pont's Baymal, sodium silicate, clays such as bentonite, and the like similar common adhesives.

It has been found highly desirable to insert the air seal consisting of an impervious sheet immediately after one convolution of the mat for several reasons. First, it is necessary to get a fiber to fiber or wool to wool laminate upon the mandrel in order to insure a smooth and properly secured internal surface. Maintaining the impervious sheet as close as possible to the interior of the duct provides the added advantage of using less sheet material to achieve the necessary construction with a maximum of exterior insulating material, and permits complete curing of the duct under the most economical conditions. The mat is cured from the outside in, and an externally positioned sheet would retard curing the interior of the duct. Since it has been determined that the only way air can escape from the duct is to follow the impervious sheet, the instant duct is normally constructed so that the sheet never touches itself, and provided the overlap is at least about ½ convolution of the sheet, the pressure drop through the glass fiber mat over the extent of the overlap is such that internal air cannot escape or be sucked out of the duct. The duct nevertheless may be constructed with the mat separated in or from two or more mat sections whereby the foil overlaps and contacts itself intermediate the mat sections.

By means of the internal use of the gas impervious sheet, it has been found that adequate duct performance may be obtained from about 7 convolutions of the thin glass fiber mat, with between 6 and 10 being useful. The interior positioning of the impervious sheet provides minimum interior moisture hold up and provides the maximum antisweat resistance. That is, by having a minimum amount of internal fiber wall adjacent the sheet, a minimum amount of fibrous duct material is exposed to any internal moisture collection. With regard to the antisweat resistance, it is recognized that cold air in a duct exposed to a hot external temperature develops condensation on the sheet. This is minimized by providing a maximum amount of the duct between the impervious sheet and external temperature.

While it is preferred to control the placement of the air seal sheet as above described, it should be noted that other workable products not as satisfactory can be obtained so long as one-plus convolutions of foil are inserted in the duct. It should be further noted that variations in fiber diameter and mat density can alter the air resistance and can be a determining factor in the number of convolutions of impervious sheet and placement thereof. Generally, the finer fibered, denser mats require fewer convolutions to achieve satisfactory air seal.

The impervious sheet air seal material to be used in the duct of the invention may comprise either a metallic foil, such as alumina foil, or a metallic coated material, such as aluminum coated plastic film, or other similar air seal materials comprising plastic films, fabrics or textiles or paper coated or treated to be gas impermeable, etc. The impervious sheet should have sufficient thickness to resist tearing or other damage during installation for the given material. Preferably the air seal is a plain annealed aluminum foil without lacquer or other coating and between 0.00025–0.0020 inch thick. Suitable plastic films comprise polyethylene, cellulose triacetate and the vinyls including polyvinyl chloride, polyvinyl acetate, polyvinyl acetals, and polyvinyl alcohol.

A more complete understanding of the invention may be obtained by reference to the following examples of operations within the scope of this invention. All parts and percentages are by weight unless otherwise indicated.

EXAMPLES I–XIII

Ducts were prepared from glass fiber mats having fibers of an average diameter between 0.00014 and 0.00018 inch and containing 10–13% phenol formaldehyde binder, and were made having a 7/16 inch wall with densities varying from 3.5 pounds to 5.0 pounds in accordance with the procedure outlined above, i.e., winding a fibrous mat on a mandrel. The 3.75 pound density was adequate for the smaller range of sizes, i.e. 4 inches through 6 inches, and other densities were selected as follows: 7 inches through 10 inches, 4 pounds; 12 inches through 14 inches, 4.25 pounds; and 16 inches, 4.50 pounds. In each size duct wall thicknesses were less than 1.5 inches and normally less than 1 inch.

Of the foil thicknesses investigated, the 0.0007 inch aluminum foil was preferred because of its handling characteristics and economics. Thinner foils present some difficulty during handling because of the flimsiness and a heavier foil while useful was found not necessary to perform the function required.

The foil was introduced into the laminations by laying the foil in cut sheet form on top of the glass fiber mat and winding it up into the section.

Using the straight interleaf to provide the air seal, the samples were prepared in which the number of wraps of foil were systematically decreased until test results indicated the required air seal had been obtained. The standard for acceptable air leakage used is described below.

The samples were tested between static pressures of ½ inch to 6 inches of water. The basic need is a duct suitable for use in design conditions of 1 inch static pressures. Samples having the ends sealed against air leakage were subjected to air pressure of not less than 0.5 inch water column for one hour. The amount of air necessary to maintain this pressure is measured and using the volume within the sample, calculated from the inside measurements, the loss of air did not exceed twenty times the calculated volume, the criterion of specification. The over-all test results indicated that with 1½ wraps of foil, the duct would have a 50 to 75% safety margin in air leakage when operating under 1 inch static pressure conditions as compared to Underwriters' standard. Therefore, 1½ wraps of foil are preferred. The results are shown below in Table I.

Six ducts were further tested in accordance with Underwriters' Laboratories Publication No. 181 as follows:

Fire retardant tests were conducted using a refractory lined gas-fired combustion chamber open at top. The samples were tested at the top of the chamber. No premix of gas and combustion air was used. No dampers or regulators were used for combustion air or venting. The test samples were 18 inches square and the material surface which was considered to be the outside surface of the air duct was the surface exposed to the flame during test. The samples were subjected to an 8 pound static load applied through bearing surface of 1 x 4 inches in geometric center of specimen. The combustion chamber was closed by a ¼ inch thick sheet of asbestos millboard and brought to an equilibrium temperature of 1400° F. Asbestos millboard was replaced by the sample, subjected to the load and with no change in gas burner settings subjected to the flame. The samples withstood the fire-retardant test without collapse, evidence of perforations that allowed flame direct passage through the specimens, and without ignition occurring on the specimens' exterior. The test was continued thirty minutes for Class 0 and Class 1 air ducts.

Puncture test consisted of dropping a 2-pound ⅜-inch diameter steel rod, having a contact end 9/16 inch in diameter, through a free fall of 20 inches over the top surface of the air duct resting on a firm support. The plunger head did not perforate the wall of the duct.

In static load test the samples were two feet longer than recommended suspension distance and had a recommended joint at its center. They were subjected to a static load of ten pounds at the center of the support span. One inch wide pipe strap material was used for support and for weight support. With the sample supported as a beam and subjected to a static load of ten pounds applied at its longitudinal center, the maximum vertical deflection taken at the bottom of the duct, expressed as a percentage of the distance between supports, did not exceed:

(A) 0.7 percent at the end of 5 minutes,
(B) 0.8 percent at the end of 1 hour,
(C) 1.0 percent at the end of 24 hours, and
(D) 0.8 percent at the end of 5 minutes after removal of the load.

Following the load test, the inner and outer surfaces were not ruptured; joints and seams were neither fractured nor showed other visible damage which would indicate likelihood of permitting air leakage.

For impact test, samples from the load test were placed on flat, concrete floor and a cloth bag filled with sand to a weight of 20 pounds was dropped from a height of 10 inches above the top surface of the duct so as to strike it at the longitudinal center or at the joint of the sample. The vertical inside dimension of the duct should not be permanently decreased by more than 15% of the dimension taken prior to load test and impact test. No rupture of joints, inner wall, or seams occurred that would permit air leakage.

Additional air leakage tests were conducted as described above.

The results of all tests are shown below in Table II.

TABLE I.—VOLUME OF AIR LOST AT DIFFERENT PRESSURES

| No. of foil wraps | Vol. loss/hr. at ½″ pressure | Vol. loss/hr. at 1″ pressure | Vol. loss/hr. at 1½″ pressure |
|---|---|---|---|
| 3½ | 1.1 | 2.1 | 3.0 |
| 1½ | 6.1 | 11.4 | 16.6 |

TABLE II

| | Diameter (in.) | Static load tests, percent | | | | Impact test, 20 lbs. 10″ drop | Air leakage (vol. per hour) | | | | | Puncture test, 20 lb. rod 20″ drop |
|---|---|---|---|---|---|---|---|---|---|---|---|---|
| | | Load on for 5 min. | Load on for 1 hr. | Load on for 24 hrs. | Load off for 5 min. | | ΔP ½″ | ΔP 1″ | ΔP 1½″ | ΔP 2″ | ΔP 4″ | |
| Production sections joined by metal sleeve plus adhesive and supported on 4″ centers. | 5 | 0.46 | 0.46 | 0.46 | 0.07 | OK | 11.4 | 19.5 | 25.9 | 31.3 | 49.0 | OK |
| | 6 | 0.59 | 0.59 | 0.65 | 0.07 | OK | 7.5 | 12.7 | 17.2 | 21.0 | 32.9 | OK |
| | 7 | 0.59 | 0.59 | 0.59 | 0.07 | OK | 6.3 | 10.4 | 13.9 | 16.7 | 25.5 | OK |
| | 8 | 0.39 | 0.39 | 0.52 | 0.07 | OK | 4.6 | 7.8 | 10.5 | 12.7 | 19.4 | OK |
| | 9 | 0.46 | 0.46 | 0.46 | 0.07 | OK | 3.7 | 6.0 | 8.0 | 9.7 | 14.9 | OK |
| | 10 | 0.33 | 0.33 | 0.33 | 0.07 | OK | 3.0 | 5.1 | 6.8 | 8.3 | 12.6 | OK |

Fire retardant test: Samples of the duct were investigated in accordance with the specifications (U/L No. 181) using actual test furnace. Samples passed as specified for Class 1 air duct material.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A siliceous fiber duct adapted for the conveyance of air consisting of a convolutely wound mat of siliceous fibers integrally united at their intersections by a thermoset resin uniformly dispersed throughout said mat in an amount between 5 and 30% by weight of the mat, said duct additionally containing an air seal consisting of an air impervious foil convolutely wound within said duct coextensively with said mat and beginning approximately after the first internal convolution of said mat and continuing for between 1 and 5 convolutions of said mat, and an outer face of a continuation of said convolutely wound mat.

2. A glass fiber air duct consisting of convolutely wound mat of glass fibers having a density of between 2 and 10 pounds per cu. ft., said mat being integrally formed into said duct by means of a thermoset resin uniformly dispersed throughout said mat in an amount between about 5 and 30% by weight of said mat, and an air impervious foil convolutely wound within said duct coextensively with said mat from the second convolution through an extent equal to between 1 and 5 additional convolutions.

3. A glass fiber air duct as defined in claim 2 wherein the mat density is between 3.5 and 5.5 pounds per cu. ft. and the foil extends approximately 1½ convolutions.

4. A glass fiber air duct as defined in claim 3 wherein the foil is an aluminum foil.

5. A glass fiber air duct as defined in claim 4 wherein the foil is approximately 0.00025–0.0020 inch thick.

6. A light weight, fibrous duct having gas impervious walls for the conveyance of air, comprising a convolutely wound, low density, bonded silicate fiber mat, said fiber mat containing binder dispersed therethrough adhering the fibers in amount of approximately 5 to approximately 30% by weight of the fibers and having a density about 2 to about 10 pounds per cubic foot, the convolutely wound fiber mat containing an interiorly interleaved gas impervious foil seal consisting of a gas impervious sheet convolutely wound intermediate the convolutions of the fiber mat substantially coextensive the convolutions of said mat beginning approximately following the first convolution internally of the duct and continuing at least one complete convolution.

7. The light weight, fibrous duct of claim 6 wherein the interiorly interleaved gas impervious seal consisting of a gas impervious sheet convolutely wound intermediate the convolutions of the fiber mat substantially coextensive the convolutions of said mat beginning approximately following the first convolution internally of the duct and continuing at least one convolution up to approximately five convolutions of the mat.

8. The light weight, fibrous duct of claim 7 wherein the interiorly interleaved gas impervious seal consists of metallic foil.

9. The light weight, fibrous duct of claim 7 wherein the interiorly interleaved gas impervious seal consists of plastic film.

10. The light weight, fibrous duct of claim 7 wherein the interiorly interleaved gas impervious seal consists of a sheet of fibrous material selected from at least one member from the group consisting of a textile cloth and paper, treated to render it gas impermeable.

11. The light weight, fibrous duct of claim 7 wherein the bonded silicate fiber mat contains approximately 10 to approximately 15% of thermosetting resin binder and its density is about 3.5 to about 5.5 pounds per cubic foot, the interiorly interleaved gas impervious seal consists of aluminum foil and continues for approximately 1½ up to approximately 2 convolutions.

References Cited

UNITED STATES PATENTS

| | | | |
|---|---|---|---|
| 318,458 | 5/1958 | Fletcher | 138—138 |
| 2,714,414 | 8/1955 | DeGanahl et al. | 156—171 |
| 2,744,043 | 5/1956 | Ramberg | 156—155 |
| 2,748,830 | 6/1956 | Nash et al. | 156—171 |
| 2,854,031 | 9/1958 | Donaldson | 138—141 |
| 2,954,803 | 10/1960 | Barnes et al. | 138—143 |
| 3,080,893 | 3/1963 | Creycraft | 138—141 |
| 3,091,262 | 5/1963 | Donaldson | 138—143 |
| 3,166,319 | 1/1965 | Brilhart | 138—143 |

PATRICK D. LAWSON, *Primary Examiner.*

PO-1050
(5/69)

UNITED STATES PATENT OFFICE
CERTIFICATE OF CORRECTION

Patent No. 3,436,401        Dated April 15, 1969

Inventor(s)      G. J. Hannes

It is certified that error appears in the above-identified patent and that said Letters Patent are hereby corrected as shown below:

Column 1, line 52, "anr" should be --and--. Column 2, line 14, "resutling" should be --resulting--; line 20, "by new should be --by a new--; line 33, "formation" should be --foraminous--; line 47, "at costs" should be --at low costs-- line 48, "fiberlized" should be --fiberized--. Column 3, line 3, "finally" should be --fully--.

SIGNED AND
SEALED
MAR 24 1970

(SEAL)
Attest:

Edward M. Fletcher, Jr.
Attesting Officer

WILLIAM E. SCHUYLER, JR
Commissioner of Patents